United States Patent
Jakab et al.

(10) Patent No.: US 11,943,150 B2
(45) Date of Patent: Mar. 26, 2024

(54) TRACKING APPLICATION SCALING FOR NETWORK BANDWIDTH ALLOCATION

(71) Applicant: Cisco Technology, Inc., San Jose, CA (US)

(72) Inventors: Lorand Jakab, Gheorghieni (RO); Alberto Rodriguez Natal, Redwood City, CA (US); Fabio R. Maino, Palo Alto, CA (US); John G. Apostolopoulos, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 12 days.

(21) Appl. No.: 17/147,724

(22) Filed: Jan. 13, 2021

(65) Prior Publication Data

US 2022/0116337 A1 Apr. 14, 2022

Related U.S. Application Data (60) Provisional application No. 63/089,323, filed on Oct. 8, 2020.

(51) Int. Cl.
*H04L 47/783* (2022.01)
*G06F 9/54* (2006.01)

(52) U.S. Cl.
CPC ............ *H04L 47/783* (2013.01); *G06F 9/547* (2013.01)

(58) Field of Classification Search
CPC ................................ H04L 47/783; G06F 9/547
(Continued)

(56) References Cited

U.S. PATENT DOCUMENTS

2013/0286846 A1* 10/2013 Atlas .................... H04L 47/726
370/235
2014/0241366 A1* 8/2014 Smith .................... H04L 45/74
370/392
(Continued)

FOREIGN PATENT DOCUMENTS

CA          3103238          12/2019
EP          3716063 A1       9/2020

OTHER PUBLICATIONS

Jain et al., B4: experience with a globally-deployed software defined wan, ACM SIGCOMM Computer Communication Review, vol. 43, Issue 4, Oct. 2013, pp. 3-14 (Year: 2013).*

(Continued)

*Primary Examiner* — Clayton R Williams
*Assistant Examiner* — Chong G Kim
(74) *Attorney, Agent, or Firm* — Lee & Hayes P.C.

(57) ABSTRACT

Techniques for tracking compute capacity of a scalable application service platform to perform dynamic bandwidth allocation for data flows associated with applications hosted by the service platform are disclosed. Some of the techniques may include allocating a first amount of bandwidth of a physical underlay of a network for data flows associated with an application. The techniques may also include receiving, from a scalable application service hosting the application, an indication of an amount of computing resources of the scalable application service that are allocated to host the application. Based at least in part on the indications, a second amount of bandwidth of the physical underlay to allocate for the data flows may be determined. The techniques may also include allocating the second amount of bandwidth of the physical underlay of the network for the data flows associated with the application.

20 Claims, 6 Drawing Sheets

(58) Field of Classification Search
USPC .......................................................... 709/226
See application file for complete search history.

(56) References Cited

U.S. PATENT DOCUMENTS

| | | | |
|---|---|---|---|
| 2014/0317261 | A1 | 10/2014 | Shatzkamer et al. |
| 2017/0126792 | A1* | 5/2017 | Halpern ................ H04L 41/147 |
| 2017/0289002 | A1 | 10/2017 | Ganguli et al. |
| 2019/0034219 | A1 | 1/2019 | Xu et al. |
| 2019/0052532 | A1* | 2/2019 | Chen ...................... H04L 47/781 |
| 2019/0081879 | A1 | 3/2019 | Wu et al. |
| 2020/0252234 | A1* | 8/2020 | Ramamoorthi ......... H04L 41/12 |
| 2020/0287794 | A1 | 9/2020 | Rastogi et al. |

OTHER PUBLICATIONS

Yang et al., Software-Defined Wide Area Network (SD-WAN): Architecture, Advances and Opportunities, 2019 28th International Conference on Computer Communication and Networks (ICCCN), 2019, pp. 1-9 (Year: 2019).*

Manso et al., Cloud-native SDN Controller Based on Micro-Services for Transport Networks, 2020 6th IEEE Conference on Network Softwarization (NetSoft), 2020, pp. 365-367 (Year: 2020).*

Wang et al., Dawn: Co-programming Distributed Applications with Network Control, NAI '20: Proceedings of the Workshop on Network Application Integration/CoDesign, Aug. 2020, pp. 14-19 (Year: 2020).*

Vilalta et al., uABNO: A Cloud-Native Architecture for Optical SDN Controllers, 2020 Optical Fiber Communications Conference and Exhibition (OFC), 2020, pp. 1-3. (Year: 2020).*

Serracanta et al., Wide Area Network Autoscaling for Cloud Applications, NAI'21: Proceedings of the ACM SIGCOMM 2021 Workshop on Network-Application Integration, Aug. 2021, pp. 1-6 (Year: 2021).*

The International Search Report and Written Opinion for PCT Application No. PCT/US21/51464, dated Jan. 7, 2022.

* cited by examiner

TRACKING APPLICATION SCALING FOR NETWORK BANDWIDTH ALLOCATION

RELATED APPLICATIONS

This application claims priority to U.S. Provisional Patent Application No. 63/089,323, filed on Oct. 8, 2020, the entire contents of which are incorporated herein by reference.

TECHNICAL FIELD

The present disclosure relates generally to tracking the compute capacity of a scalable application service platform to perform dynamic bandwidth allocation for data flows associated with applications hosted by the service platform.

BACKGROUND

In typical overlay network deployments that provide connectivity to applications, bandwidth in the underlay is usually over-provisioned and/or dynamically billed since bandwidth requirements of different applications might unpredictably change. Generally, underlay connectivity providers need to allocate enough bandwidth for these applications and constantly monitor actual bandwidth consumption to ensure adequate provisioning and billing, resulting in the provisioning and de-provisioning of bandwidth over time. On the other hand, overlay network controllers need not only make sure that the necessary bandwidth is actually provisioned in the underlay, but also that the application requirements in terms of bandwidth are actually met. Today, these operations are usually based on estimations by human operators of both the overlay and the underlay networks, observed behavior in the past, predictions of the future, and the like, all combined with a fair amount of guesswork.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies for tracking the compute capacity of a scalable application service platform to perform dynamic bandwidth allocation for data flows associated with applications hosted by the service platform. By way of example, and not limitation, a method according to the various technologies presented herein may include allocating a first amount of bandwidth of a physical underlay of a network for data flows associated with an application. The method may also include receiving, at a network controller associated with the network and from a scalable application service hosting the application, an indication of an amount of computing resources of the scalable application service that are allocated to host the application. Based at least in part on the indications, a second amount of bandwidth of the physical underlay to allocate for the data flows may be determined. In this way, the method may include allocating the second amount of bandwidth of the physical underlay of the network for the data flows associated with the application.

Additionally, the techniques described herein may be performed as a method and/or by a system having non-transitory computer-readable media storing computer-executable instructions that, when executed by one or more processors, performs the techniques described above.

Example Embodiments

As discussed above, in typical overlay network deployments that provide connectivity to applications (e.g., SD-WAN), bandwidth in the underlay is usually over-provisioned and/or dynamically billed since bandwidth requirements of different applications might unpredictably change. Generally, underlay connectivity providers need to allocate enough bandwidth for these applications and constantly monitor actual bandwidth consumption to ensure adequate provisioning and billing, resulting in the provisioning and de-provisioning of bandwidth over time. On the other hand, overlay network controllers need not only make sure that the necessary bandwidth is actually provisioned in the underlay, but also that the application requirements in terms of bandwidth are actually met. Today, these operations are usually based on estimations by human operators of both the overlay and the underlay networks, observed behavior in the past, predictions of the future, and the like, all combined with a fair amount of guesswork.

Additionally, in some cases, to compensate for required over-provisioning of bandwidth on the underlay, overlay operators may opt-in for a dynamic billing model, where the underlay connectivity provider may only bill for the bandwidth actually consumed by customers. This, in turn, forces the underlay provider to appropriately instrument their network to reliably measure for actual bandwidth usage and, equally important, to provide verifiable proof to the overlay operator.

While meeting application bandwidth requirements has been a long-standing problem, it has become even more relevant with modem applications. As applications moved from bare metal to virtual machines (VMs), and from there to the cloud, the elastic vision of compute resources has finally become a reality. In other words, as load on an application increases, new compute resources can be allocated for that specific application. Furthermore, with the move to containers and scalable container-orchestration systems (e.g., Kubernetes, Amazon ECS, Docker Swarm, Apache Mesos, etc.), the elastic model of compute resources has reached another level. While VMs can request more resources, or be cloned to allow for dynamic application loads, the transition to containers has made automated application scaling the baseline for modem applications.

For instance, the Kubernetes application replication model introduces clear and well-defined mechanisms to dynamically accommodate the compute requirements of auto-scalable applications. At its core, these mechanisms monitor computing resource utilization and/or other metrics of a current set of replicas for a given application to decide when an application needs to be scaled. Although different autoscaling approaches may be used by these container-orchestration systems, in many cases the extra resources and/or replicas are allocated according to pre-defined usage thresholds defined by the DevOps managing the application. Unfortunately, however, wide area networks providing customers access to applications hosted by these container-orchestration systems have yet to catch up to the elasticity that these systems enable. While using a software-defined/application programming interface (API)-driven underlay provider (e.g., PacketFabric, Megaport, Equinix Fabric, PCCW Global's ConsoleConnect, etc.) could offer flexible models to plan capacity on WAN connections, as of today they do not provide a way to automatically select and balance the provisioned network capacity according to the actual application load.

Accordingly, this disclosure describes various improvements in technologies that, among other things, provides for tracking of compute capacity of a scalable application service platform (e.g., a container-orchestration system such as Kubernetes, Amazon ECS, Docker Swarm, Apache Mesos, etc.) to perform dynamic bandwidth allocation for data flows associated with applications hosted by the service platform. For instance, if API-driven underlays are available (e.g., PacketFabric), the techniques disclosed herein extend network controllers (e.g., vManage on Cisco Viptela SD-WAN) to offer to the application service an autoscaling network by tracking automated application scaling of a container-orchestration system (e.g., Kubernetes, etc.). Thus, rather than having to monitor the application's bandwidth utilization and guessing when extra bandwidth may be required, the network controller tracks the allocated computing resources and/or number of replicas of a certain application in a container-orchestration system cluster. The network controller may then tie the dynamic allocation of bandwidth of a software-defined/API-driven underlay (e.g., PacketFabric, Megaport, etc.) with a scalable application service's scalability mechanisms. Accordingly, the techniques of this disclosure realize an improvement in computing technology by more precisely allocating bandwidth of an underlay of a network when it is needed, and de-allocating bandwidth when it is not needed. This improves the efficiency of software-defined/API-driven underlays. Additionally, by performing the techniques herein as described, the scalable application service, including individual applications hosted by the service, are completely agnostic to the autoscaling of bandwidth in the network underlay. In this way, the application configuration/infrastructure are unmodified, and no change is required to the application or the scalable application service to perform the techniques described herein.

By way of example and not limitation, a method according to the techniques disclosed herein may include allocating a first amount of bandwidth of a physical underlay of a network for data flows associated with an application. For instance, a computing device that is in whole or in part programmed as a network controller of the network may send a request to allocate the first amount of bandwidth to an application programming interface (API) associated with the physical underlay of the network. In turn, the API may cause the first amount of bandwidth of the physical underlay to be allocated for the data flows associated with the application. In this way, application traffic/data may flow between client devices and a scalable application service that is hosting the application via the data flows. In some instance, the physical underlay may include one or more networking devices and/or components, such as routers, switches, modems, cables, and the like.

In some examples, the method may include receiving, from the scalable application service hosting the application, an indication of an amount of computing resources of the scalable application service that are allocated to host the application (e.g., a number of replicas of the application generated and/or hosted by the scalable application service, a compute capacity of the scalable application service, an amount of containers currently hosted by the scalable application service, an amount of computing resources allocated by the scalable application service, and the like). As used herein, a "scalable application service" means a container-orchestration system as described above, such as, for example, Kubemetes, Amazon ECS, Docker Swarm, Apache Mesos, and the like. Additionally, the scalable application service may be cloud-based, cloud-native, and/or datacenter-based. In some instances, the indication may be received by the network controller of the network. Additionally, or alternatively, the network controller may receive the indication based at least in part on polling an API associated with the scalable application service for the indication (e.g., by sending, to the API, a request for the API to provide the indication of the amount of computing resources that are allocated to host the application).

Based at least in part on the indication of the amount of computing resources of the scalable application service that are allocated to host the application, the method may include determining that the first amount of bandwidth of the physical underlay is to be increased or decreased. In some examples, this may include determining a second amount of bandwidth of the physical underlay to allocate for the data flows in addition to the first amount of bandwidth. Additionally, or alternatively, this may include determining a second amount of bandwidth of the physical underlay to de-allocate for the data flows (e.g., by de-allocating a portion of the first amount of bandwidth such that less bandwidth is allocated for the data flows).

In some instances, determining that the first amount of bandwidth of the physical underlay is to be increased or decreased may be based at least in part on a bandwidth-allocation model. The bandwidth-allocation model may be a user-defined bandwidth allocation model or may be determined based at least in part on using machine learning (e.g., by associating prior amounts of allocated bandwidth with prior amounts of allocated computing resources for applications). For example, the network controller may receive a user defined bandwidth-allocation model specifying respective amounts of bandwidth of the physical underlay to allocate for the data flows based at least in part on respective amounts of computing resources of the scalable application service that are allocated to host applications. Additionally, or alternatively, determining the amount of bandwidth that is to be allocated or de-allocated may be based at least in part on a prior amount of bandwidth of the physical underlay that was allocated for the data flows at a time when the amount of the computing resources of the scalable application service were allocated to host the application. That is, a history of prior amounts of bandwidth of the physical underlay that were allocated to serve respective amounts of computing resources of the scalable application may be used to determine how much bandwidth of the physical underlay should be allocated or de-allocated.

The method may also include, in some examples, causing the first amount of bandwidth of the physical underlay to be increased or decreased. That is, the first amount of bandwidth may be increased or decreased such that a second amount of bandwidth of the physical underlay is allocated for the data flows associated with the application. In some instances, the second amount of bandwidth may comprise more bandwidth than the first amount of bandwidth, and in other instances the second amount of bandwidth may comprise less bandwidth than the first amount of bandwidth. In any event, however, whether the second amount of bandwidth comprises more or less bandwidth than the first amount of bandwidth depends on the amount of computing resources of the scalable application service that are allocated to host the allocation. That is, if the amount of computing resources has increased then bandwidth may increase as well, and if the amount of computing resources has decreased then bandwidth may decrease as well. In this way, more or less data flows associated with the application may utilize the physical underlay to communicate traffic/data between client devices and the application service. In some instances, if the first amount of bandwidth of the physical underlay is decreased such that a portion of the first amount of bandwidth is de-allocated, then the portion of the first amount of bandwidth may be re-allocated to be used by other data flows associated with other applications.

In some examples, causing the first amount of bandwidth of the physical underlay to be increased or decreased may comprise sending, to an API associated with the network, a request for the API to allocate the second amount of bandwidth of the physical underlay of the network. In some instances, the API may be associated with the physical underlay.

In some examples, the amount of underlay bandwidth that is to be allocated based at least in part on the current application load may be established by a network operator. By way of example, and not limitation, the operator could establish that each (milli) CPU unit allocated to the application might require 5 MB/s of bandwidth, or that each replica of the application requires 100 MB/s on a WAN connection. As extra CPU units are allocated or new application replicas are instantiated, the network may automatically provision more bandwidth. Further fine tuning may be possible as well. For instance, the operator could configure that the first 10 replicas require 100 MB/s each but that any replicas above 10 require 70 MB/s each.

Additionally, or alternatively, the amount of underlay bandwidth that is to be allocated based at least in part on the current application load may be controller-driven (e.g., determined by the network controller device). For instance, the network controller may automatically determine the bandwidth required per CPU unit and/or application replica. In some examples, this may be determined by observing actual throughput generated by the application over time and correlating it with the application autoscaling state. Those skilled in the art should understand that this method may require some trial and error on the heuristics of the network controller before efficient bandwidth allocation can be achieved and thus might require overprovisioning of bandwidth on the underlay for some time. However, by gathering a history of prior network needs by application replica, various methods exist to estimate the predicted bandwidth need as well as probability of outliers, etc. Furthermore, as the number of application replica increases, the accuracy percentage of predicting the needed bandwidth generally increases (via central limit theorem, machine learning, etc.), so generally prediction performance improves with increasing history and as the number of application replicas for which the bandwidth needs to be predicted increases.

Additionally, or alternatively, the amount of underlay bandwidth that is to be allocated based at least in part on the current application load may be a hybrid of operator-driven and controller driven methods. That is the operator may define some baseline numbers of bandwidth associated with each application replica and/or compute units, but the controller may enable fine tuning of the recommended bandwidth as it observes the actual consumption over time. The recommendations may be then applied automatically by the controller or given as an option to the operator.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1A:
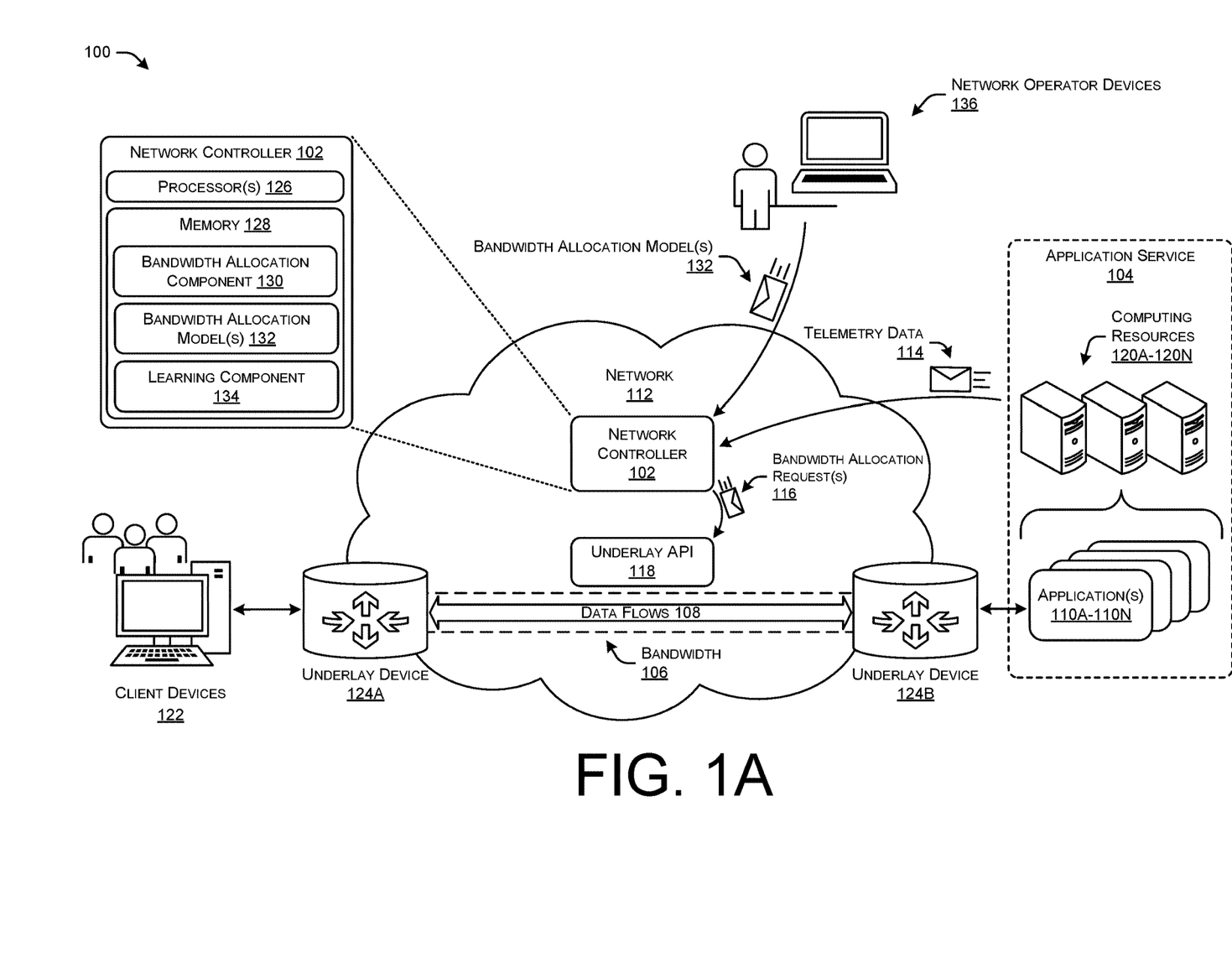
FIGS. 1A and 1B illustrate a system-architecture diagram of an example environment in which a network controller may track compute capacity of an application service to dynamically allocate bandwidth for data flows associated with applications hosted by the application service.
Figure 1B:
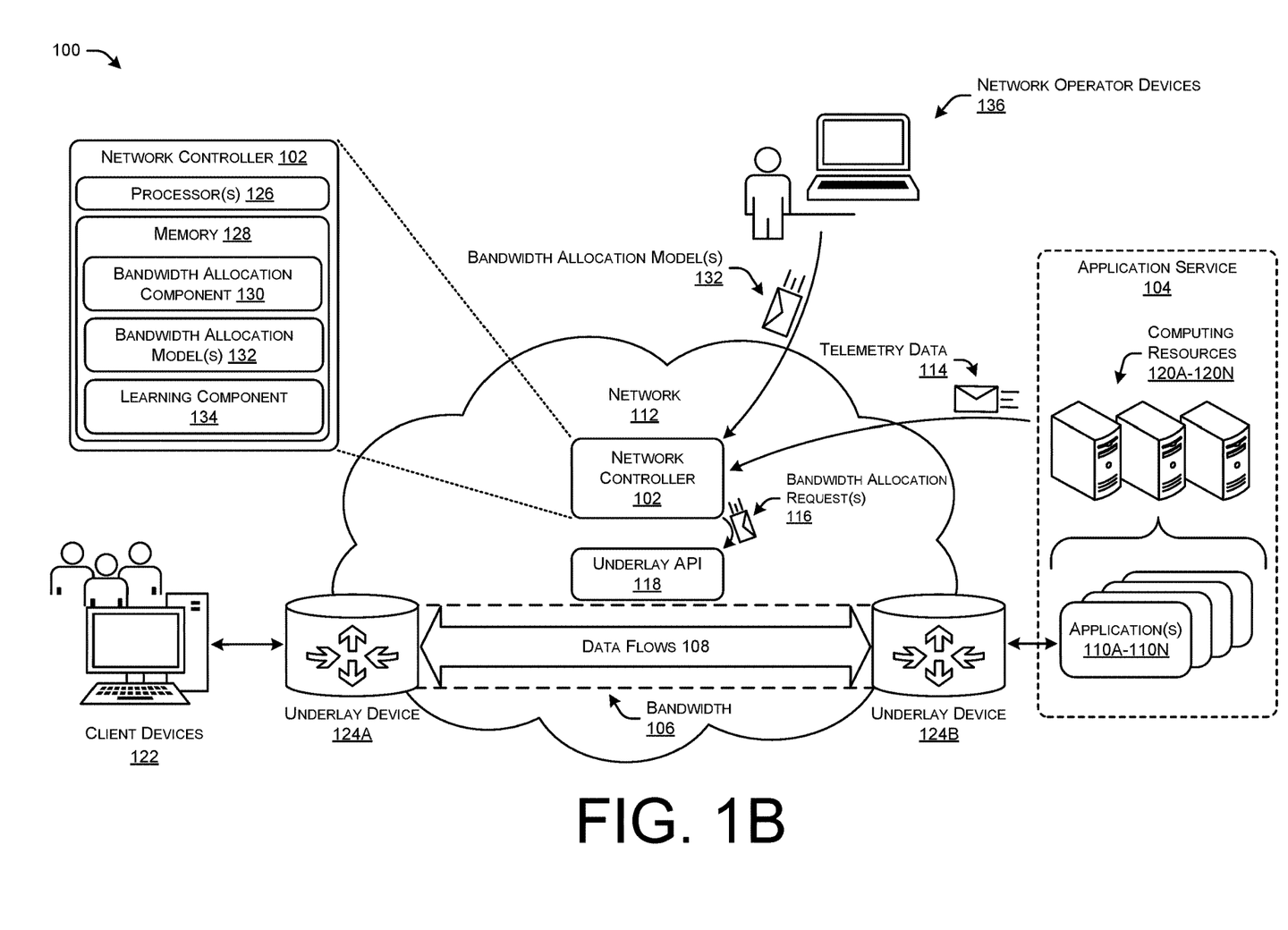

FIGS. 1A and 1B illustrate a system-architecture diagram of an example environment 100 in which a network controller 102 may track compute capacity of an application service 104 to dynamically allocate bandwidth 106 for data flows 108 associated with one or more applications 110A-110N (hereinafter referred to collectively as "applications 110," and where N represents any number of applications greater than or equal to 1) hosted by the application service 104. For example, the network controller 102 of the network 112 may receive telemetry data 114 (e.g., indicating an amount of computing resources 120A-120N of the application service 104 that are currently allocated to host the applications 110) from the application service 104 and, based at least in part on the telemetry data 114, the network controller 102 may determine that more or less of the bandwidth 106 is to be allocated or de-allocated. Accordingly, the network controller 102 may send one or more bandwidth allocation requests 116 to an underlay API 118 (e.g., an application programming interface (API) associated with an underlay of the network 112) and, in response, the underlay API 118 may cause more or less bandwidth 106 to be allocated or de-allocated (as shown by the differences between FIGS. 1A and 1B) for increased or decreased amounts of the data flows 108 (also shown by the differences between FIGS. 1A and 1B) associated with the applications 110. In this way, when applications 110 are replicated by the application service and/or when additional computing resources 120 are being utilized by the applications 110, the bandwidth 106 for the data flows 108 between the client devices 122 and the applications 110 (e.g., using the underlay devices 124A and 124B of the network 112) may more accurately be allocated based on current demand to improve efficiency of the underlay.

In some examples, the network controller 102 may include one or more processors 126 and memory 128 communicatively coupled with the one or more processors 126. In examples, the one or more processors 126 may execute instructions stored in the memory 128 to perform one or more operations on behalf of the network controller 102. The memory 128 of the network controller 102 stores a bandwidth allocation component 130, one or more bandwidth allocation models 132, and a learning component 134.

In at least one example, the bandwidth allocation component 130 may include functionality to analyze the telemetry data 114 received from the application service 104 to determine a current amount of computing resources 120 of the application service 104 that are allocated to host the applications 110. In this way, the bandwidth allocation component 130 may determine whether the bandwidth 106 should be increased or decreased. Additionally, the bandwidth allocation component 130 may access one of the other components of the memory 128 (e.g., the bandwidth allocation models 132 and/or the learning component 134) to determine how much bandwidth to allocate between the underlay devices 124A and 124B.

As noted above, the memory 128 of the network controller 102 may store one or more bandwidth allocation models 132. In some examples, the network controller 102 may receive one or more of the bandwidth allocations models 132 from one or more network operator devices 136 and store the models in the memory 128. In additional, or alternative examples, the bandwidth allocation models 132 may be generated by the network controller 102 (e.g., using the learning component 134). For instance, the learning component 134 may generate the bandwidth allocations models 132 based at least in part on determining associations between prior amounts of bandwidth 106 allocated to serve respective amounts of computing resources 120 allocated for applications 110.

The processors 126 of the network controller 102 may be any suitable processor capable of executing instructions to process data and perform operations as described herein. By way of example and not limitation, the processors 126 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 128 of the network controller 102 is an example of non-transitory computer-readable media. The memory 128 can store an operating system and one or more software applications, instructions, programs, and/or data to implement the methods described herein and the functions attributed to the various systems. In various implementations, the memory 128 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

The application service 104 may comprise a scalable application service that hosts one or more third-party applications, virtual machines, containers, and the like using infrastructure (e.g., physical devices, such as the computing resources 120) of the scalable application service. For instance, the application service 104 may comprise a container-orchestration system as described herein, such as, for example, Kubernetes, Amazon ECS, Docker Swarm, Apache Mesos, and the like. The one or more computing resources 120 of the application service 104 may be used to host the applications 110. The computing resources 120 may comprise hardware servers, software servers that are running on computer hardware, processors, general purpose computers, and the like. In some examples, the application service 104 may comprise multiple application services that are located in different geographical regions, different networks, etc. That is, although a single instance of the application service 104 is shown in FIGS. 1A and 1B for illustration purposes, it should be appreciated that the network 112 may facilitate communication of traffic for multiple instances of the application service 104. For instance, the computing resources 120 and/or the applications 110 may be distributed between different data centers associated with the application service 104, different networks associated with the application service, different zones of a cloud service provider, and the like.

The network 112 may facilitate the communication of traffic between applications 100 of the application service 104 and client devices 122. The network 112 may comprise an overlay network and an underlay network. The overlay network may comprise a telecommunications network that is built on top of the underlay network and is supported by its infrastructure (e.g., the underlay network's physical devices, such as the underlay devices 124A and 124B). The underlay network may comprise a software-defined/API-driven underlay provider (e.g., PacketFabric, Megaport, PCCW Global's ConsoleConnect, etc.). Accordingly, the network 112 may include the network controller 102 that communicates with the underlay API 118 to instruct the underlay API 118 how much bandwidth should be allocated in the underlay of the network 112. It should be appreciated that, although shown as residing in the same network 112 for simplicity, the network controller 102 may reside in a different network than the underlay API 118 and the underlay devices 124A and 124B. In some instances, the network controller 102 may additionally, or alternatively, reside in a different geographic location than the underlay API 118 and/or the underlay devices 124A and 124B. The underlay devices 124A and 124B of the network 112 may comprise routers, switches, general purpose computers, software nodes, gateways, and/or any other networking device capable of forwarding packets through the network 112.

Figure 2:
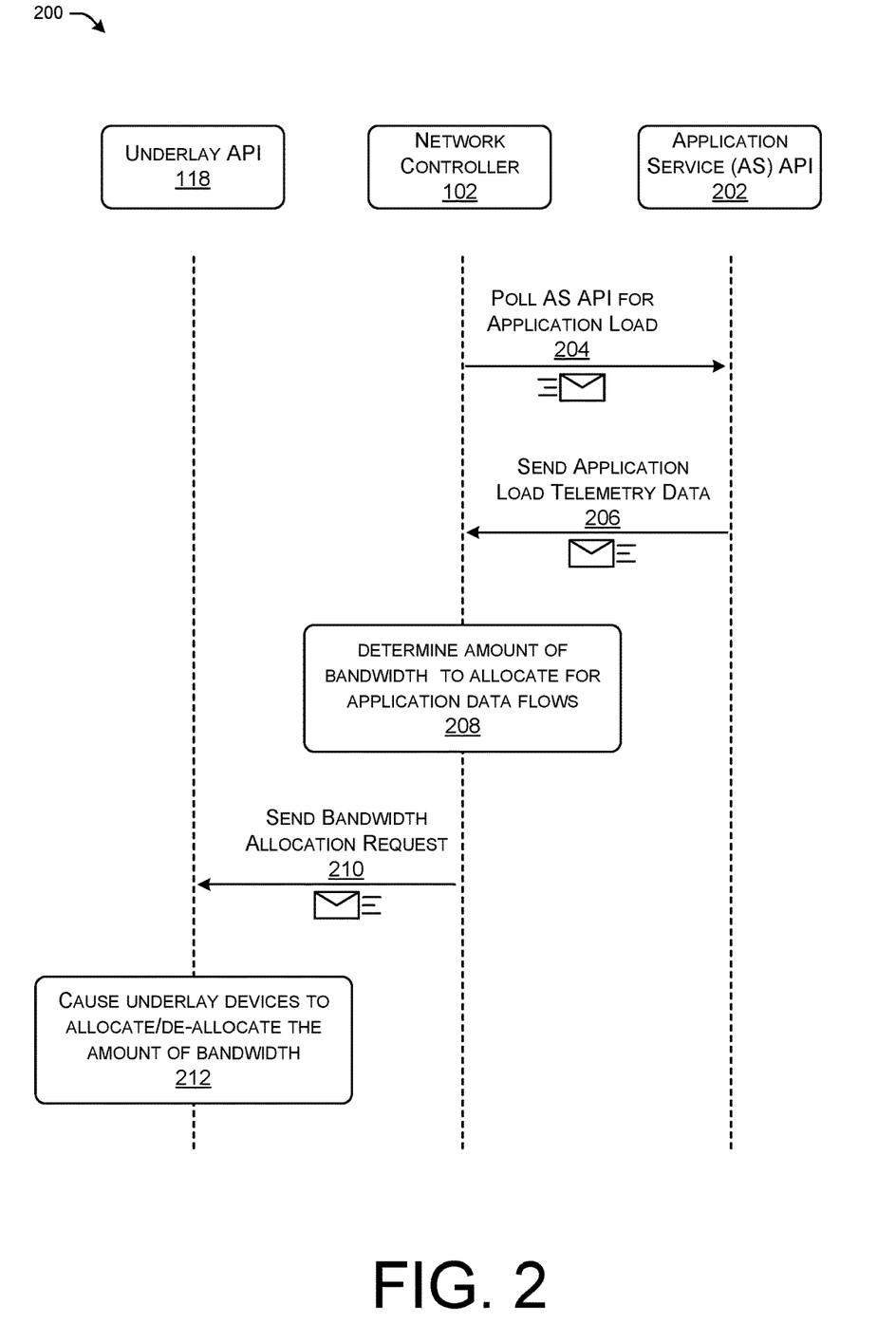
FIG. 2 illustrates a data flow diagram of an example process for tracking compute capacity of an application service to dynamically allocate bandwidth for data flows associated with applications hosted by the application service.

FIG. 2 illustrates a data flow diagram of an example process 200 for tracking compute capacity of an application service to dynamically allocate bandwidth for data flows associated with applications hosted by the application service. The process 200 may be performed, at least in part, by the network controller 102, the underlay API 118, an application service API 202, other devices described herein, and/or any other networking device capable of communicating packets. It should be understood that the various operations of the process 200 shown in FIG. 2 are merely for illustrative purposes, and that, in some examples, more or less operations may be performed, operations may be omitted, operations may be performed in parallel, etc.

At operation 204, the network controller 102 may poll the application service API 202 for the current application load of the application service. For instance, the network controller may poll the application service API 202 to receive telemetry data 114 indicating a current amount of computing resources 120 of the application service 104 that are allocated to host the applications 110, a current load of the computing resources 120, a number of applications replicas currently hosted by the application service 104, a number of containers currently hosted by the application service 104, and the like.

At operation 206, the application service API 202 may send telemetry data associated with the application load of the application service. In some examples, sending the telemetry data may be based at least in part on the network controller 102 polling the application service API. The telemetry data may indicate the current application load of the application service. For instance, the telemetry data may indicate a current amount of computing resources 120 of the application service 104 that are allocated to host the applications 110, a current load of the computing resources 120, a number of applications replicas currently hosted by the application service 104, a number of containers currently hosted by the application service 104, and the like.

At operation 208, the network controller 102 may determine an amount of bandwidth to allocate for application data flows. The data flows may be associated with an application hosted by the application service. In some instances, determining the amount of bandwidth may be based at least in part on analyzing one or more bandwidth allocation tables. The bandwidth allocation tables may indicate associations between amounts of bandwidth and amounts of consumed computing resources of the application service. That is, the bandwidth allocation tables may indicate how much bandwidth 106 is suggested to be allocated based on a current amount of computing resources 120 that are being consumed by applications 110 hosted by the application service 104. In some examples, determining the amount of bandwidth may be based at least in part on one or more prior amounts of bandwidth allocated at a time when the same or similar amount of computing resources of the application service were being consumed.

At operation 210, the network controller 102 may send a bandwidth allocation request to the underlay API 118. The bandwidth allocation request may indicate the amount of bandwidth of the underlay that is to be allocated or de-allocated for data flows associated with applications hosted by the application service. In some examples, the bandwidth allocation request may program or otherwise cause the underlay API 118 to allocated or de-allocate the bandwidth.

At operation 212, the underlay API 118 may cause the underlay devices to allocate or de-allocated the amount of bandwidth. For instance, the underlay API 118 may cause the underlay devices 124A and 124B to allocate or de-allocate the amount of bandwidth for the data flows 108 associated with the applications 110 hosted by the application service 104. In some instances, causing the underlay devices to allocate or de-allocate the amount of bandwidth may comprise sending, from the underlay API 118 and to the underlay devices, instructions to program or otherwise cause the underlay devices to allocate or de-allocate the amount of bandwidth.

Figure 3:
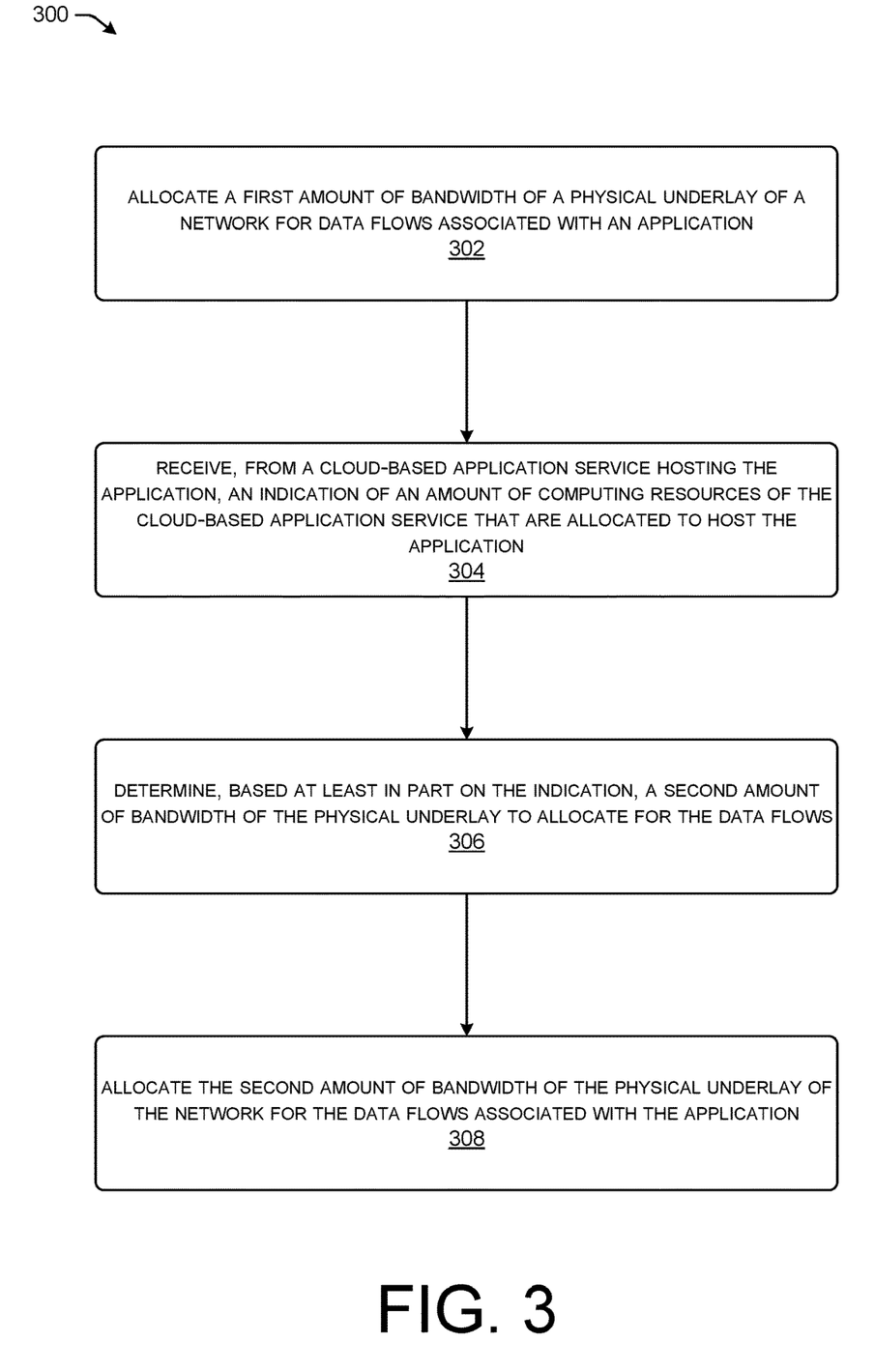
FIG. 3 illustrates a flow diagram of an example method for tracking compute capacity of an application service to dynamically allocate bandwidth for data flows associated with applications hosted by the application service.
Figure 4:
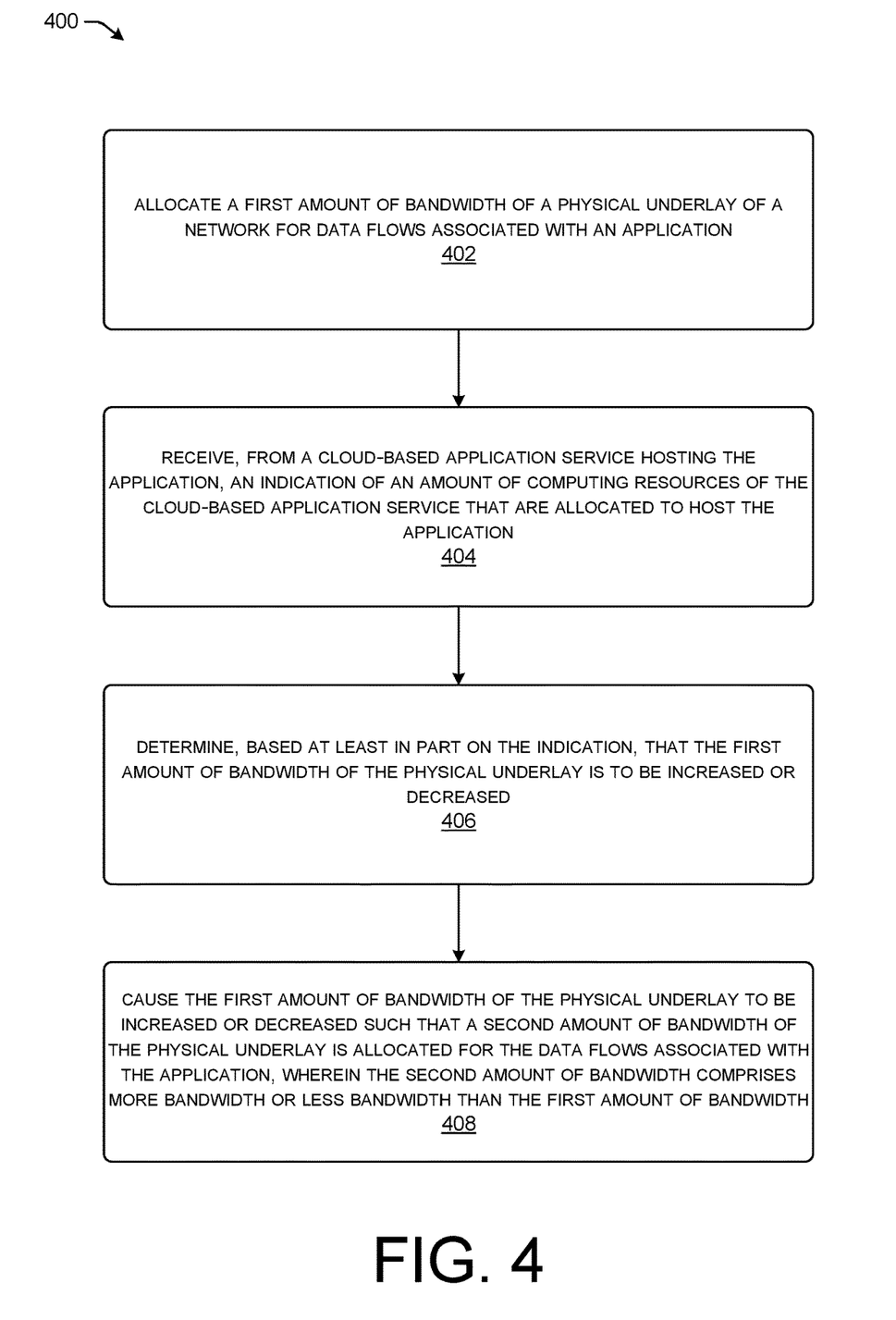
FIG. 4 illustrates a flow diagram of another example method for tracking compute capacity of an application service to dynamically allocate bandwidth for data flows associated with applications hosted by the application service.

FIGS. 3 and 4 illustrate flow diagrams of example methods 300 and 400 that illustrate aspects of the functions performed at least partly by the network controller 102 and/or other devices as described in FIGS. 1A, 1B, and 2. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for tracking compute capacity of an application service to dynamically allocate bandwidth for data flows associated with applications hosted by the application service. For instance, the network controller 102 may track the compute capacity of the application service 104 to dynamically allocated bandwidth 106 for the data flows 108 associated with the applications 110.

At operation 302, the method 300 includes allocating a first amount of bandwidth of a physical underlay of a network for data flows associated with an application. For instance, the network controller 102 of the network 112 may send a request to allocate the first amount of bandwidth to the underlay API 118. In turn, the API may cause the first amount of bandwidth of the physical underlay to be allocated for the data flows 108 associated with the application 110. In this way, application traffic/data may flow between client devices 122 and a scalable application service 104 that is hosting the application via the data flows 108. In some instances, the physical underlay may include one or more networking devices and/or components, such as routers, switches, modems, cables, and the like.

At operation 304, the method 300 includes receiving, from a scalable application service hosting the application, an indication of an amount of computing resources of the scalable application service that are allocated to host the application. For instance, the indication may comprise telemetry data 114 that is received by the network controller 102 from the application service 104, an API that is associated with the application service 104, a computing resource 120 of the application service, etc. Additionally, or alternatively, the indication may include a number of replicas of the application generated and/or hosted by the scalable application service, a compute capacity of the scalable application service, a number of containers currently hosted by the scalable application service, and the like.

At operation 306, the method 300 includes determining, based at least in part on the indication, a second amount of bandwidth of the physical underlay to allocate for the data flows. In some examples, determining the second amount of bandwidth may comprise determining a second amount of bandwidth of the physical underlay to allocate for the data flows may be in addition to the first amount of bandwidth. Additionally, or alternatively, determining the second amount of bandwidth may comprise determining a second amount of bandwidth of the physical underlay to de-allocate for the data flows (e.g., by de-allocating a portion of the first amount of bandwidth such that less bandwidth is allocated for the data flows).

In some instances, determining the second amount of bandwidth of the physical underlay to allocate for the data flows may be based at least in part on a bandwidth-allocation model. The bandwidth-allocation model may be a user-defined bandwidth allocation model or may be determined based at least in part on using machine learning (e.g., by associating prior amounts of allocated bandwidth with prior amounts of allocated computing resources for applications). For example, the network controller may receive a user defined bandwidth-allocation model specifying respective amounts of bandwidth of the physical underlay to allocate for the data flows based at least in part on respective amounts of computing resources of the scalable application service that are allocated to host applications. Additionally, or alternatively, determining the amount of bandwidth that is to be allocated or de-allocated may be based at least in part on a prior amount of bandwidth of the physical underlay that was allocated for the data flows at a time when the amount of the computing resources of the scalable application service were allocated to host the application. That is, a history of prior amounts of bandwidth of the physical underlay that were allocated to serve respective amounts of computing resources of the scalable application may be used to determine how much bandwidth of the physical underlay should be allocated or de-allocated.

At operation 308, the method 300 includes allocating the second amount of bandwidth of the physical underlay of the network for the data flows associated with the application. For instance, the network controller 102 may send, to the underlay API 118, a request for the underlay API 118 to allocate the second amount of bandwidth of the physical underlay for the data flows. In some instances, allocating the second amount of bandwidth may comprise de-allocating the second amount of bandwidth from the first amount of bandwidth (e.g., subtracting the second amount of bandwidth from the first amount of bandwidth).

FIG. 4 illustrates a flow diagram of another example method 400 for tracking compute capacity of an application service to dynamically allocate bandwidth for data flows associated with applications hosted by the application service. The method 400 begins at operation 402, which includes allocate a first amount of bandwidth of a physical underlay of a network for data flows associated with an application. The data flows may facilitate the communication of data between the application and a client device that may be consuming the application. For instance, the network controller 102 of the network 112 may send a request to allocate the first amount of bandwidth to the underlay API 118. In turn, the API may cause the first amount of bandwidth of the physical underlay to be allocated for the data flows 108 associated with the application 110. In this way, application traffic/data may flow between client devices 122 and a scalable application service 104 that is hosting the application via the data flows 108. In some instances, the physical underlay may include one or more networking devices and/or components, such as routers, switches, modems, cables, and the like.

At operation 404, the method 400 includes receiving, from a scalable application service hosting the application, an indication of an amount of computing resources of the scalable application service that are allocated to host the application. For instance, the indication may comprise telemetry data 114 that is received by the network controller 102 from the application service 104, an API that is associated with the application service 104, a computing resource 120 of the application service, etc. Additionally, or alternatively, the indication may include a number of replicas of the application generated and/or hosted by the scalable application service, a compute capacity of the scalable application service, a number of containers currently hosted by the scalable application service, and the like.

At operation 406, the method 400 includes determining, based at least in part on the indication, that the first amount of bandwidth of the physical underlay is to be increased or decreased. In some examples, determining that the first amount of bandwidth is to be increased or decreased may comprise determining a second amount of bandwidth of the physical underlay to allocate for the data flows in addition to the first amount of bandwidth. Additionally, or alternatively, determining that the first amount of bandwidth is to be increased or decreased may comprise determining a second amount of bandwidth of the physical underlay to de-allocate for the data flows (e.g., by de-allocating a portion of the first amount of bandwidth such that less bandwidth is allocated for the data flows).

In some instances, determining that the first amount of bandwidth is to be increased or decreased may be based at least in part on a bandwidth-allocation model. The bandwidth-allocation model may be a user-defined bandwidth allocation model or may be determined based at least in part on using machine learning (e.g., by associating prior amounts of allocated bandwidth with prior amounts of allocated computing resources for applications). For example, the network controller may receive a user defined bandwidth-allocation model specifying respective amounts of bandwidth of the physical underlay to allocate for the data flows based at least in part on respective amounts of computing resources of the scalable application service that are allocated to host applications. Additionally, or alternatively, determining that the first amount of bandwidth is to be increased or decreased may be based at least in part on a prior amount of bandwidth of the physical underlay that was allocated for the data flows at a time when the amount of the computing resources of the scalable application service were allocated to host the application. That is, a history of prior amounts of bandwidth of the physical underlay that were allocated to serve respective amounts of computing resources of the scalable application may be used to determine how much bandwidth of the physical underlay should be allocated or de-allocated.

Figure 5:
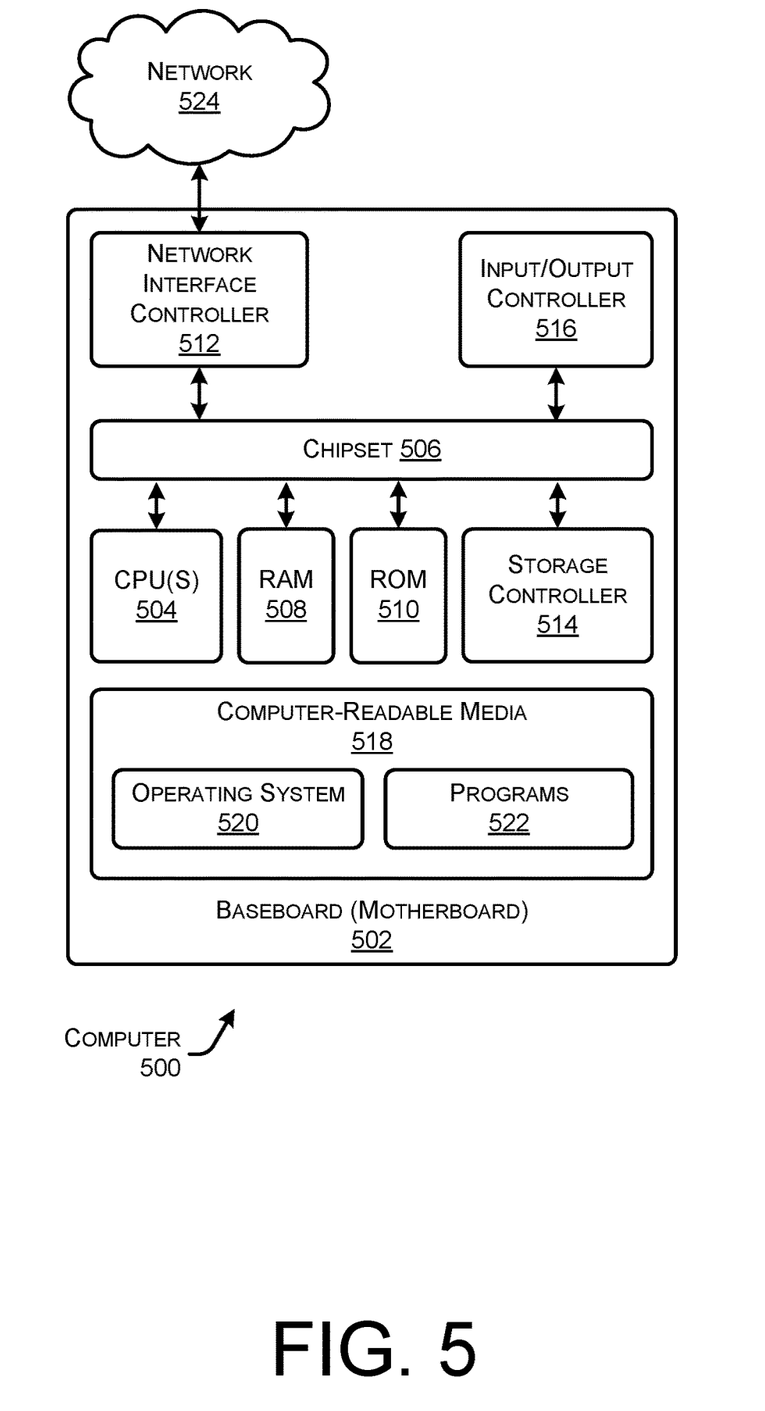
FIG. 5 is a computer architecture diagram showing an illustrative computer hardware architecture for implementing a computing device that can be utilized to implement aspects of the various technologies presented herein.

At operation 408, the method 400 includes causing the first amount of bandwidth of the physical underlay to be increased or decreased such that a second amount of bandwidth of the physical underlay is allocated for the data flows associated with the application, wherein the second amount of bandwidth comprises more bandwidth or less bandwidth than the first amount of bandwidth. For instance, the network controller 102 may send, to the underlay API 118, a request for the underlay API 118 to increase or decrease the first amount of bandwidth of the physical underlay for the data flows. In some instances, increasing or decreasing the first amount of bandwidth may comprise de-allocating a portion of the first amount of bandwidth. In this way, the de-allocated bandwidth may be re-allocated for use by other data flows associated with other applications FIG. 5 is a computer architecture diagram showing an illustrative computer hardware architecture for implementing a networking device that can be utilized to implement aspects of the various technologies presented herein. The computer architecture shown in FIG. 5 illustrates a conventional server computer, network controller 102, computing resource 120, underlay device 124, client device 122, network operator device 136, workstation, desktop computer, laptop, tablet, network appliance, e-reader, smartphone, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 106. The chipset 506 can include functionality for providing network connectivity through a NIC 512, such as a gigabit Ethernet adapter. The NIC 512 is capable of connecting the computer 500 to other computing devices over the network 524 and/or network 112. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 106 and or any components included therein, may be supported by one or more devices similar to computer 500. Stated otherwise, some or all of the operations performed by the network 106, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1A-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the source device 106 and network device 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for determining connectivity in multi-hop paths using BFD Echo packet(s). The programs 522 may enable the network device 102 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   allocating a first amount of bandwidth of a physical underlay of a network for data flows associated with an application;
   receiving, at a network controller associated with the network and from a scalable application service hosting the application, an indication of an amount of computing resources of the scalable application service that are allocated to host the application;
   determining, based at least in part on the amount of computing resources, a second amount of bandwidth of the physical underlay to allocate for the data flows; and
   allocating the second amount of bandwidth of the physical underlay of the network for the data flows associated with the application.

2. The method of claim 1, wherein the indication of the amount of computing resources comprises an indication of a number of replicas of the application generated by the scalable application service.

3. The method of claim 1, further comprising receiving, at the network controller, a user defined bandwidth-allocation model specifying respective amounts of bandwidth of the physical underlay to allocate for the data flows based at least in part on respective amounts of computing resources of the scalable application service that are allocated to host applications, and wherein determining the second amount of bandwidth is further based at least in part on the bandwidth-allocation model.

4. The method of claim 1, wherein the second amount of bandwidth is greater than the first amount of bandwidth such that additional data flows associated with the application can utilize the physical underlay.

5. The method of claim 1, wherein allocating the second amount of bandwidth comprises sending, to an application programming interface (API) associated with the network, a request for the API to allocate the second amount of bandwidth of the physical underlay of the network.

6. The method of claim 1, further comprising sending, to an application programming interface (API) associated with the scalable application service, a request for the API to provide the indication of the amount of computing resources that are allocated to host the application, and wherein receiving the indication is based at least in part on the request.

7. The method of claim 1, wherein determining the second amount of bandwidth is further based at least in part on a prior amount of bandwidth of the physical underlay that was allocated for the data flows at a time when the amount of the computing resources of the scalable application service were allocated to host the application.

8. A system comprising:
   one or more processors; and
   one or more computer-readable media storing instructions that, when executed by the one or more processors, cause the one or more processors to perform operations comprising:
   allocating a first amount of bandwidth of a physical underlay of a network for data flows associated with an application;
   receiving, from a scalable application service hosting the application, an indication of an amount of computing resources of the scalable application service that are allocated to host the application;
   determining, based at least in part on the amount of computing resources, a second amount of bandwidth of the physical underlay to allocate for the data flows; and
   allocating the second amount of bandwidth of the physical underlay of the network for the data flows associated with the application.

9. The system of claim 8, wherein the indication of the amount of computing resources comprises an indication of a number of replicas of the application generated by the scalable application service.

10. The system of claim 8, the operations further comprising receiving a user defined bandwidth-allocation model specifying respective amounts of bandwidth of the physical underlay to allocate for the data flows based at least in part on respective amounts of computing resources of the scalable application service that are allocated to host applications, and wherein determining the second amount of bandwidth is further based at least in part on the bandwidth-allocation model.

11. The system of claim 8, wherein the second amount of bandwidth is greater than the first amount of bandwidth such that additional data flows associated with the application can utilize the physical underlay.

12. The system of claim 8, wherein allocating the second amount of bandwidth comprises sending, to an application programming interface (API) associated with the network, a request for the API to allocate the second amount of bandwidth of the physical underlay of the network.

13. The system of claim 8, the operations further comprising sending, to an application programming interface (API) associated with the scalable application service, a request for the API to provide the indication of the amount of computing resources that are allocated to host the application, and wherein receiving the indication is based at least in part on the request.

14. The system of claim 8, wherein determining the second amount of bandwidth is further based at least in part on a prior amount of bandwidth of the physical underlay that was allocated for the data flows at a time when the amount of the computing resources of the scalable application service were allocated to host the application.

15. A non-transitory computer-readable storage medium storing instructions that, when executed by a computing device, cause the computing device to perform operations comprising:
  allocating a first amount of bandwidth of a physical underlay of a network for data flows associated with an application;
  receiving, from a scalable application service hosting the application, an indication of an amount of computing resources of the scalable application service that are allocated to host the application;
  determining, based at least in part on the amount of computing resources, that the first amount of bandwidth of the physical underlay is to be increased or decreased; and
  causing the first amount of bandwidth of the physical underlay to be increased or decreased such that a second amount of bandwidth of the physical underlay is allocated for the data flows associated with the application, wherein the second amount of bandwidth comprises more bandwidth or less bandwidth than the first amount of bandwidth.

16. The non-transitory computer-readable storage medium of claim 15, wherein the indication of the amount of computing resources comprises an indication of a number of replicas of the application generated by the scalable application service.

17. The non-transitory computer-readable storage medium of claim 15, the operations further comprising generating a bandwidth-allocation model indicating respective amounts of bandwidth of the physical underlay to allocate for the data flows based at least in part on respective amounts of computing resources of the scalable application service that are allocated to host applications, and wherein determining the second amount of bandwidth is further based at least in part on the bandwidth-allocation model.

18. The non-transitory computer-readable storage medium of claim 15, wherein the indication comprises an indication of a decrease in the amount of computing resources of the scalable application service that are allocated to host the application, the operations further comprising:
  determining that the first amount of bandwidth of the physical underlay is to be decreased; and
  causing the first amount of bandwidth of the physical underlay to be decreased such that the second amount of bandwidth of the physical underlay is allocated for the data flows associated with the application.

19. The non-transitory computer-readable storage medium of claim 18, the operations further comprising allocating a portion of the first amount of bandwidth of the physical underlay of the network to be used by other data flows associated with other applications.

20. The non-transitory computer-readable storage medium of claim 15, wherein allocating the second amount of bandwidth comprises sending, to an application programming interface (API) associated with the network, a request for the API to allocate the second amount of bandwidth of the physical underlay of the network.

* * * * *